(12) United States Patent
Asco et al.

(10) Patent No.: US 7,174,538 B2
(45) Date of Patent: Feb. 6, 2007

(54) COMPUTER STORAGE SUBSYSTEM, METHOD, SOFTWARE PROGRAM AND DATA CARRIER

(75) Inventors: Amadeo Asco, Keyworth (GB); Rober James Marris, Southampton (GB); Barry Douglas Whyte, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 10/187,863

(22) Filed: Jul. 1, 2002

(65) Prior Publication Data
US 2003/0110471 A1 Jun. 12, 2003

(30) Foreign Application Priority Data
Dec. 6, 2001 (GB) .................................. 0129232.5

(51) Int. Cl.
G06F 9/44 (2006.01)
(52) U.S. Cl. ........................................ 717/116; 717/108
(58) Field of Classification Search ................ 717/104, 717/116; 707/200, 100–104, 103 R–103 Z, 707/104.1; 714/28, 32
See application file for complete search history.

(56) References Cited

U.S. PATENT DOCUMENTS

| 65,838 | A | * | 6/1867 | Wakai et al. .................. 149/29 |
| 5,778,227 | A | * | 7/1998 | Jordan ..................... 707/103 R |
| 5,941,994 | A | * | 8/1999 | DeKoning et al. .............. 714/7 |
| 5,963,958 | A | * | 10/1999 | Cottrill ..................... 707/104.1 |
| 6,219,802 | B1 | * | 4/2001 | Beeker et al. ................. 714/32 |
| 6,321,347 | B1 | * | 11/2001 | Beeker et al. ................. 714/28 |
| 6,532,471 | B1 | * | 3/2003 | Ku et al. ..................... 707/102 |
| 6,601,233 | B1 | * | 7/2003 | Underwood ................. 717/102 |
| 6,708,186 | B1 | * | 3/2004 | Claborn et al. ............. 707/102 |
| 6,724,875 | B1 | * | 4/2004 | Adams et al. ......... 379/201.01 |
| 6,775,676 | B1 | * | 8/2004 | Briam et al. ................. 707/101 |
| 2002/0065838 | A1 | * | 5/2002 | Wakai et al. ................ 707/200 |
| 2003/0140027 | A1 | * | 7/2003 | Huttel et al. ................... 707/1 |
| 2003/0208493 | A1 | * | 11/2003 | Hall et al. ................... 707/100 |

* cited by examiner

FOREIGN PATENT DOCUMENTS

GB 2278000 A 11/1994

OTHER PUBLICATIONS

Lu et al. "ODMG Extension of Composite Objects in OODBMS: A proposal", Feb., 2002, Australian Computer Society, Inc., pp. 133-141.*

Primary Examiner—Wei Zhen
Assistant Examiner—Anna Deng
(74) Attorney, Agent, or Firm—Harrington & Smith, LLP

(57) ABSTRACT

A software program and an object definitions database are provided for a storage subsystem of a computer system. The subsystem has at least one physical storage medium (P), The program is arranged to generate logical resources (L, R5, D, LR, FC, FW) from a database containing logical resource definitions and user object definitions. The logical resources are arranged as sets of object definitions, and the selection is performed in dependence upon the at least one physical storage medium (P); User objects (110, 120, 130, 140, 150, 162, 164, 166, 170, 182, 184, 186) are generated from the database in dependence upon the generated logical resources (L, R5, D, LR, FC, FW). In this way the generated user objects (110, 120, 130, 140, 150, 162, 164, 166, 170, 182, 184, 186) enable the computer system to utilize the physical storage media (P) via the generated logical resources (L, R5, D, LR, FC, FW). This provides a storage subsystem which is feature rich, which has far simpler source code, and which is relatively straightforward for a user.

25 Claims, 2 Drawing Sheets

COMPUTER STORAGE SUBSYSTEM, METHOD, SOFTWARE PROGRAM AND DATA CARRIER

FIELD OF THE INVENTION

This invention relates to computer data storage subsystems and particularly but not exclusively to the management of complex features within such computer data storage subsystems.

BACKGROUND OF THE INVENTION

In the field of this invention it is known that hardware architecture of data storage subsystems changes frequently. It is well known that the management software required for such subsystems is typically complex, resulting in lengthy and involved software development and ongoing software maintenance which is similarly problematic.

In addition to this, changes to subsystem hardware inevitably require changes to the management software, for example, to support new features or to change the capabilities of existing features. Compatibility issues arise between mismatches of software and hardware and these are difficult to resolve. Hence costly rebuilds of these management software tools are required whenever a change occurs in the hardware.

Older systems addressed these problems in a number of ways, such as the presence of large amounts of otherwise unnecessary source code in the software. This also has the problem that every time a restriction is required/changed the source code had to be modified, recompiled and tested again before release.

Furthermore, many computer data storage subsystems now provide 'enhanced' features that provide functions other than standard Input/Output (I/O) operations. By their very nature, these features provide complex manipulation of raw data held on magnetic media or in non-volatile memory. For example a feature such as a point in time copy (Flash-Copy) allows a user to copy an entire/part of a file system from one logical resource to another.

In previous subsystems users were not hidden from the underlying stacked logical resources (there were typically only 2 or 3) and this level of complexity was reasonable to expose to the user. In present subsystems there may be 7 or 8 logical resources, which would be unreasonably complex for a user, so a 'logical to object' relationship is created, which requires a certain amount of software complexity. In this way the management software handles the complexity of multiple logical resources, rather than the user.

Another approach taken in older systems is known as 'View/Data/Action definitions'. This requires all the resource details to be hard-coded in the source code. There is no 'inheritance', so each type of logical resource has to be defined in source code with respect to the views, data and actions available to them.

The increased complexity of 'next generation' storage subsystems and the proliferation of logical resources and features has therefore exacerbated this problem.

A need therefore exists for a computer storage subsystem, method, software program and data carrier wherein the abovementioned disadvantages may be alleviated.

STATEMENT OF INVENTION

In accordance with a first aspect of the present invention there is provided a computer storage subsystem as claimed in claim 1.

In accordance with a second aspect of the present invention there is provided a method as claimed in claim 4.

In accordance with a third aspect of the present invention there is provided a software program as claimed in claim 7.

In accordance with a third aspect of the present invention there is provided a data carrier as claimed in claim 10.

Preferably the subsystem has subsystem storage attribute values for at least one operating system, the computer system being arranged to operate using one of the at least one operating systems, wherein the subsystem is arranged to select attribute values relating to at least one operating systems in use by the computer system, such that the attribute values are used to ensure that the generated logical resources and generated user objects satisfy attribute requirements of the operating system.

The subsystem is preferably further arranged to recognise generated user objects which do not comply with user object definitions of the database, and to remove such non-compliant user objects from the subsystem.

In this way a computer storage subsystem, method, software program and data carrier is provided which provides enhanced features without the need for burdensome complexity for a user, and without requiring complex and unwieldy management software. Furthermore, such management software does not require recompiling and retesting when a hardware or operating system change occurs.

BRIEF DESCRIPTION OF THE DRAWINGS

One computer storage subsystem, method, software program and data carrier incorporating the present invention will now be described, by way of example only, with reference to the accompanying drawings, in which.

DESCRIPTION OF PREFERRED EMBODIMENT(S)

Storage subsystems are generally now designed with cross-platform functionality, so that the same hardware and firmware can be used with multiple operating systems with little or no modification. The software must, however, be able to cope with the facilities available to the operating system in use. During development and test it is possible that the manufacturer may wish to limit the types of logical resources, or even attributes relating to the resources, that apply to certain operating systems/environments.

An Object Definition Database (ODD) allows a designer to define the 'capabilities' of the subsystem given a particular operating environment. In addition an ODD provides a mechanism to abstract logical resource complexity from the end user by defining 'user objects' that are actually multiple logical resources (at the subsystem level). This allows the user to maintain a single object, rather than multiple logical resources. As an ODD provides a list of the logical resources that are combined to produce 'valid user objects' this also allows software programs to detect 'partial objects', which are user objects that are malformed, and where appropriate to destroy them. This will be further described below.

Figure 1:
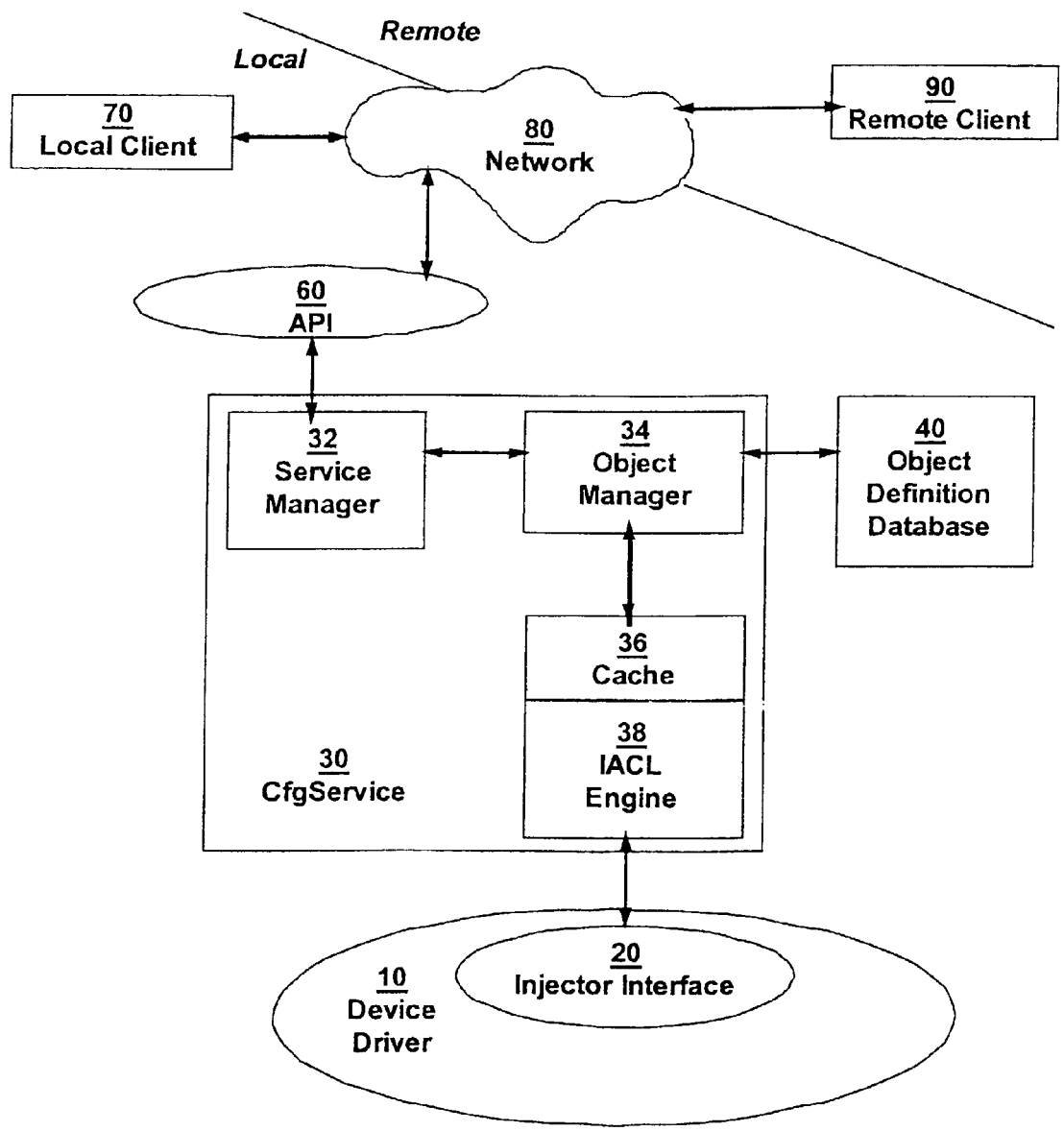
FIG. 1 shows an illustrative block diagram of a storage subsystem in accordance with the present invention; and, FIG. 2 shows a notional block diagram of physical and logical resources mapped by the subsystem of FIG. 1.

Referring now to FIG. 1, there is shown a computer software system incorporating a complex storage subsystem 30 using an ODD 40. A device driver 10 talks to the subsystem 30 via an injector interface 20. The subsystem 30 operates in conjunction with a PCI (Peripheral Component Interconnect) adapter and the physical disk drives to which it is connected (not shown). The subsystem 30 gathers data relating to the logical resources of which it is aware. In order to create logical resources the PCI adapter requires some 'attributes' that define the resources—the entire supported range of these attributes are provided by the PCI adapter.

An object manager 34 of the subsystem 30 requests the attributes and their allowable ranges from the PCI adapter. The user can then modify the attributes if necessary and submit the details back to the object manager 34 which in turn sends them back to the PCI adapter. The PCI adapter then creates a new logical resource given the attribute values supplied.

A cache 36 of the subsystem 30 is coupled between the object manager 34 and an IACL engine 38 to be further described below. The cache 36 is a memory based store of the logical resource views reported by the adapter. The cache 36 stores the logical resource structures for subsequent reporting to the user via the API 60. This provides a fast reporting method for user applications, rather than having to query the logical resources and build the user objects every time the user requests a view.

The IACL (IPN Array Configuration Language) engine 38 is coupled between the cache 36 and the injector interface 20. IPN (Independent Packet Network) is the I/O protocol used by the PCI adapter firmware (not shown). The IACL engine 38 is a software interface used to translate user requests into IACL transactions which the PCI adapter firmware understands. Each transaction is either a view or action request targeted at an individual logical resource.

The ODD 40 is primarily a database that uses a predetermined data format to create various structures. The structures must be constructed from certain templates. The ODD 40 may contain ADAPTERS, FILTERS, RESOURCES, Self Defining Structures (SDS), INTERVALS, ACTIONS, VIEWS and DATA. These are ordered in a hierarchical manner, such that ADAPTERS contain FILTERS, FILTERS contain ACTIONS and VIEWS, and so on.

Each structure in the ODD 40 is used to refine the capabilities of an adapter given the current operating environment. The logical resource attributes and ranges provided by the adapter may be a superset of the allowable (supported) attributes and ranges for any one operating environment. The ODD 40 therefore provides for the restriction of certain attributes and their ranges where appropriate. Each attribute corresponds to an adapter Self-Defining Structure (SDS). The SDS describes the type of data to which the attribute relates and the range of values it may have. The ODD 40 can redefine these SDS attributes and in particular the ranges (INTERVALS) that are applicable in each operating environment.

The ODD 40 also contains details of the allowed parameters relating to data storage subsystems in different operating systems. For example, under Microsoft Windows NT, only a RAID-5 (Redundant Array of Independent Disks) array that contains 5 component disks is supported, but the adapter defines that a RAID-5 array can contain from 3–16 component disks. This information is stored in the ODD 40, and the Object Manager 34 would use this information to state that if the operating system is Windows NT, a RAID-5 array will be restricted to supporting 5 component disks. The complexity of the software is reduced as these restrictions need not be hard-coded into the software.

This also allows changes to be made to the ODD 40 without a resultant code change—therefore simplifying change and the development/test cycles that would normally be required when code changes. In practice if the software using the ODD 40 is well tested to begin with, a change to the ODD 40 may not even require re-testing.

The ODD 40 also defines user objects. User objects are described in terms of the logical resources that must be available (created) to provide a valid user object. Therefore the ODD 40 defines the objects that the end user can manipulate and abstracts from the end user the fact that, for example, a single user object may actually be multiple logical resources.

Such user objects are defined as RESOURCE structures in the ODD 40—these contain the list (including the order) of stacked FILTER resources they are made from. (Filter resources in this context are logical resources). This again abstracts the complexity from the software, as the software simply references the ODD 40 to find what user resources exist and how they are constructed from the internal filter (logical) resources.

The Object Manager 34 then combines the logical resources into what are known as 'user objects'. These objects are then passed through a service manager 32 and Application Programming Interface (API) 60 to be displayed/maintained by the client tools, such as illustrated in FIG. 1 by a local client 70 and a remote client 90 coupled to the API 60 via a network 80.

The ODD 40 also defines what ACTIONS and VIEWS are available to the client tools. An action is a task, such as 'Diagnose' or 'Start FlashCopy'. A view is a group of DATA structures that are require to depict the logical resource attributes. Essentially this is a definition of the capabilities of API 60 for the given hardware and operating environment configuration. For example a RAID-5 user object can be defined to have a 'concise view', a 'full view', a 'delete action' and a 'clone' action. These definitions are made in the ODD 40 and the software references the ODD 40 to find what views (and the data elements contained within said views) and actions it can present through the API 60. User Objects can be said to inherit their views and actions from the underlying logical resources.

Figure 2:
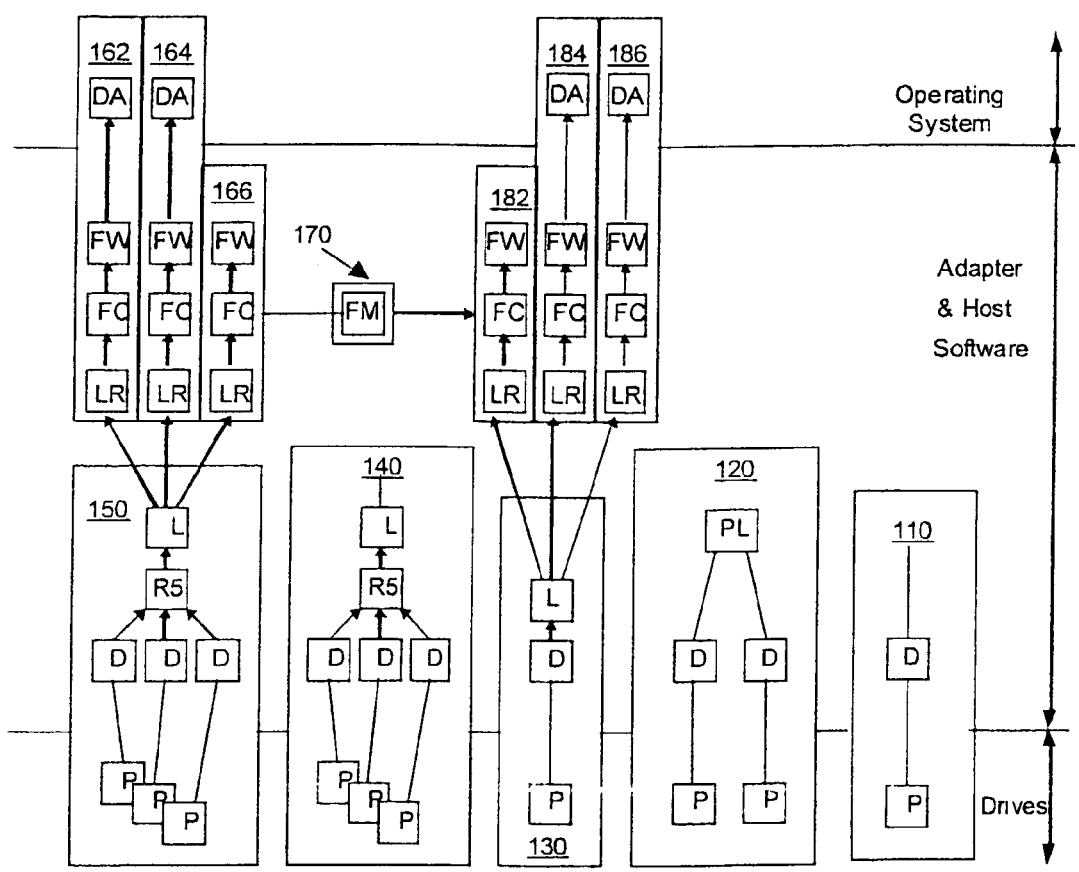

Referring now also to FIG. 2, there is shown a set of logical resources and user objects defined for an array of physical drives, illustrating the relationships therebetween. In this diagram, the physical resources are denoted by the boxes marked P, representing physical disk drives. The logical resources are as follows:
 R5 denotes a RAID 5 filter;
 FW denotes a fast write filter;
 PL denotes a hot-swap spare pool;
 D denotes a free disk or disk component;
 FC denotes a FlashCopy filter;
 L denotes a partitioning filter;
 DA denotes a Driver Automatic filter, which functions within the operating system;
 FM (box 170) denotes a FlashCopy mapping step; and
 LR denotes a Logical Unit (LUN) resource.

The user objects comprise a number of the logical resources arranged in a hierarchical array, and these are further described below.

In the illustrated exemplary implementation, each logical resource is managed by an adapter filter. This filter will generally provide a definable function, for example a RAID-5 filter (R5) splits incoming data into portions for writing to multiple physical disks. In general, user objects contain a stack of filter (logical) resources.

A user object 110 represents a free disk object, and comprises a physical disk (P) coupled to a free/component disk filter (D). This is the basic building block for user objects.

A user object 120 represents a hot-spare pool object, and comprises two physical disks (P), each coupled to a free/component disk filter (D), and a single Hot-spare pool filter (PL) coupled to both free/component disk filters (D). This is a pool of essentially free disk objects (equivalent to two user objects 110) that are available to be taken by a RAID filter when the filter detects that one of its component disk objects has gone offline or has failed.

A user object 130 represents a partitionable disk object, and comprises a physical disk (P), a free/component disk filter (D) and a partitioning filter (L), coupled in series. This is a logical resource that can be split (partitioned) into multiple LUN resources (LR). This function allows large disks or arrays to be partitioned at a level below the operating system to present smaller logical disk objects (LUN resources) to the operating system. In this case it is split into three LUN resources to be further described below.

A user object 140 represents a partitionable array object. This is the same as object 130, except the underlying logical resource is a RAID-5 array, rather than a single disk object. Therefore the user object 140 comprises three physical disks (P) coupled via three respective free/component disk filters (D) to a single partitioning filter (L) via a single RAID-5 filter (R5). Again, this can be partitioned to present smaller disk objects. In this case, object 140 is not presenting any LUN resources, as the partitioning filter is not coupled to any LUN resources (LN).

Similarly, a user object 150 is another partitionable RAID-5 object, comprising three physical disks (P) coupled via three respective free/component disk filters (D) to a single partitioning filter (L) via a single RAID-5 filter (R5). In this case the partitioning filter is coupled to three LUN resources (LR) to be further described below, and therefore this user object is presenting three LUN resources (LR).

Since the ODD 40 defines 'valid' user objects, it therefore also defines invalid or 'partial' user objects, these being user objects having combinations of logical resources not present in the ODD 40. This fact can be used by the software to decide if an object is a 'partial' object, in which an error may have occurred before a complete stack (valid user object) has been created.

By way of example, the object 140 of FIG. 2 shows a 'partitionable RAID-5 user object'. The ODD 40 will define that such an object must contain a RAID-5 logical resource and a partitionable logical resource (R5 and L) if a R5 exists but no corresponding L exists, then the R5 is a 'partial' object and can be destroyed.

The user objects 162, 164, 184 and 186 are IO Target user objects, each comprising a LUN resource (LR), a FlashCopy (FC) filter, a Fast Write (FW) filter and a Driver Automatic filter (DA) coupled in series. FlashCopy provides the ability to perform a point in time, or snapshot, copy of the data held on the LUN resource (LR). Fast Write provides a non-volatile write cache, allowing data writes to be completed to the operating system without actually committing the data to magnetic media. Each Driver Automatic (DA) filter presents its IO Target user object to the operating system.

The user objects 166 and 182 differ from user objects 162, 164, 184 and 186 in that they are not being presented to the operating system as they do not contain the top-most filter, the Driver Automatic (DA) filter.

The LUN resources (LR) of user objects 162, 164 and 166 are coupled to the partitioning filter (L) of the user object 150. Similarly the LUN resources (LR) of user objects 182, 184 and 186 are coupled to the partitioning filter (L) of the user object 130.

In this way, only the user objects 162, 164, 184 and 186 are seen by the operating system as Physical Disk resources. In other words, the operating system can perform IO to these logical resources with the data "filtering" down the stack of logical resources to eventually end up on the magnetic media represented by the Physical Disk objects (P) of user object 150 (in the case of IO via user objects 162 and 164) and of user object 130 (in the case of IO via user objects 184 and 186).

The object 170 is a FlashCopy mapping. This defines a relationship between two IO target objects, in this case 166 and 182. A relationship must be in place for the user to "trigger" a point in time copy of one disk to another.

It will be understood that the method for defining resource capabilities in storage subsystem described above provides the following advantages. Firstly, it restricts the attributes available for logical resources by using a subset of the subsystem capabilities based on the operating environment.

Secondly, it defines how logical resources relate to user objects by using database structures, thereby aiding partial object destruction and reducing user complexity.

Thirdly it defines what can be seen and what actions can be performed with respect to each logical resource (and hence each user object) that is configurable via the API 60.

It will be appreciated that alternative embodiments to that described above are possible. For example, the arrangements of physical resources, logical resources and user objects are purely illustrative, and other arrangements and combinations are envisaged.

Similarly the precise arrangement of the subsystem may differ in detail from the subsystem 30 as described above.

What is claimed is:

1. A storage subsystem for use with a computer system, comprising:

at least one physical storage medium;
a database containing a plurality of logical resource definitions arranged as predetermined sets of object definitions;
a plurality of user object definitions;
a program interface arranged to generate logical resources for the at least one physical medium according to the sets of object definitions, and further arranged to generate user objects from the generated logical resources, wherein each user object is defined in terms of at least one of the generated logical resources, wherein the logical resources include logical filter resources, wherein at least one user object comprises a physical disk coupled to a disk filter and at least one user object comprises a logical unit resource coupled to a filter, wherein the at least one user object that comprises a logical unit resource is capable of interfacing with one of the at least one user object that comprises a physical disk;
subsystem storage attribute values for at least one operating system, the computer system being arranged to operate using one of the at least one operating systems, wherein the subsystem is arranged to select the attribute values relating to at least one operating systems in use by the computer system, such that the attribute values are used to ensure that the generated logical resources and generated user objects satisfy attribute requirements of the operating system, wherein the generated user objects enable the computer system to utilise the at least one physical storage medium via the logical resources, wherein the subsystem is further arranged to recognise generated user objects which do not comply with user object definitions of the database, and to remove such non-compliant user objects from the subsystem.

2. A method of operating a storage subsystem of a computer system, the subsystem having at least one physical storage medium, the method comprising:

generating logical resources from a database containing logical resource definitions and user object definitions, the logical resources being arranged as sets of object definitions, the selection being performed in dependence upon the at least one physical storage medium; and generating user objects from the database from the generated logical resources, wherein each user object is described in terms of at least one of the generated logical resources, wherein the logical resources include logical filter resources, wherein at least one user object comprises a physical disk coupled to a disk filter and at least one user object comprises a logical unit resource coupled to a filter, wherein the at least one user object that comprises a logical unit resource is capable of interfacing with one of the at least one user object that comprises a physical disk;

wherein the subsystem is arranged to select attribute values relating to at least one operating systems in use by the computer system, such that the attribute values are used to ensure that the generated logical resources and generated user objects satisfy attribute requirements of the operating system;

wherein the generated user objects enable the computer system to utilise the at least one physical storage medium via the generated logical resources, wherein the subsystem is further arranged to recognise generated user objects which do not comply with user object definitions of the database, and to remove such non-compliant user objects from the subsystem.

3. A software program embodied in a storage subsystem of a computer system, the subsystem having at least one physical storage medium, the program implementing method steps comprising:

generating logical resources from a database containing logical resource definitions and user object definitions, the logical resources being arranged as sets of object definitions, the selection being performed in dependence upon the at least one physical storage medium;

generating user objects from the generated logical resources, wherein each user object is described in terms of at least one of the generated logical resources, wherein the logical resources include logical filter resources, wherein at least one user object comprises a physical disk coupled to a disk filter and at least one user object comprises a logical unit resource coupled to a filter, wherein the at least one user object that comprises a logical unit resource is capable of interfacing with one of the at least one user object that comprises a physical disk;

subsystem storage attribute values for at least one operating system, the computer system being arranged to operate using one of the at least one operating systems, wherein the subsystem is arranged to select attribute values relating to at least one operating systems in use by the computer system, such that the attribute values are used to ensure that the generated logical resources and generated user objects satisfy attribute requirements of the operating system;

wherein the generated user objects enable the computer system to utilise the at least one physical storage medium via the generated logical resources, wherein the subsystem is further arranged to recognise generated user objects which do not comply with user object definitions of the database, and to remove such non-compliant user objects from the subsystem.

4. A storage subsystem comprising at least one physical storage medium and further comprising a controller coupled between an application programs interface and a device driver, said controller operating for gathering data relating to resources of said storage subsystem, said controller comprising an object manager that is bidirectionally coupled to an object definition database that defines user objects in terms of serially coupled resources selected from a predetermined set of hierarchically ordered resources, wherein each user object is described in terms of at least one of the generated logical resources, wherein the logical resources include logical filter resources, wherein at least one user object comprises a physical disk coupled to a disk filter and at least one user object comprises a logical unit resource coupled to a filter, wherein the at least one user object that comprises a logical unit resource is capable of interfacing with one of the at least one user object that comprises a physical disk;

subsystem storage attribute values for at least one operating system, the computer system being arranged to operate using one of the at least one operating systems, wherein the subsystem is arranged to select attribute values relating to at least one operating systems in use by the computer system, such that the attribute values are used to ensure that the generated logical resources and generated user objects satisfy attribute requirements of the operating system;

wherein the generated user objects enable the computer system to utilise the at least one physical storage medium via the generated logical resources, wherein the subsystem is further arranged to recognise generated user objects which do not comply with user object definitions of the database, and to remove such non-compliant user objects from the subsystem.

5. A storage subsystem as in claim 4, where said hierarchically ordered resources comprise logical resources and physical resources.

6. A storage subsystem as in claim 4, where said hierarchically ordered resources comprise Adapters, Filters, Resources, Self Defining Structures, Intervals defined as ranges applicable in an operating environment, Actions, Views and Data.

7. A storage subsystem as in claim 4, where said object definition database stores details of allowable parameters of data storage subsystems as a function of operating system type.

8. A storage subsystem as in claim 5, where one of said user objects is defined as a partitionable disk object.

9. A storage subsystem as in claim 5, where one of said user objects is defined as a partitionable disk array object.

10. A storage subsystem as in claim 9, where said partitionable disk array object is comprised of a plurality of physical disk resources that are coupled to an operating system through a plurality of serially coupled filter logical resources.

11. A storage subsystem as in claim 4, where said object definition database defines valid user objects for enabling only partial user objects to be removed from said object definition database.

12. A method for operating a storage subsystem of a type having at least one physical storage medium, comprising:
providing a controller coupled between an application programs interface and a device driver; and
operating said controller for gathering data relating to resources of said storage subsystem by operating object manager that is bidirectionally coupled to an object definition database for defining user objects in terms of serially coupled resources selected from a predetermined set of hierarchically ordered resources, wherein each user object is described in terms of at least one of the generated logical resources, wherein the logical resources include logical filter resources, wherein at least one user object comprises a physical disk coupled to a disk filter and at least one user object comprises a logical unit resource coupled to a filter, wherein the at least one user object that comprises a logical unit resource is capable of interfacing with one of the at least one user object that comprises a physical disk;
wherein the subsystem is arranged to select attribute values relating to at least one operating systems in use by the computer system, such that the attribute values are used to ensure that the generated logical resources and generated user objects satisfy attribute requirements of the operating system;
wherein the generated user objects enable the computer system to utilise the at least one physical storage medium via the generated logical resources,
wherein the subsystem is further arranged to recognise generated user objects which do not comply with user object definitions of the database, and to remove such non-compliant user objects from the subsystem.

13. A method as in claim 12, where said hierarchically ordered resources comprise logical resources and physical resources.

14. A method as in claim 12, where said hierarchically ordered resources comprise Adapters, Filters, Resources, Self Defining Structures, Intervals defined as ranges applicable in an operating environment, Actions, Views and Data.

15. A method as in claim 12, where said object definition database stores details of allowable parameters of data storage subsystems as a function of operating system type.

16. A method as in claim 13, where one of said user objects is defined as a partitionable disk object.

17. A method as in claim 13, where one of said user objects is defined as a partitionable disk array object.

18. A method as in claim 17, where said partitionable disk array object is defined by coupling a plurality of physical disk resources to an operating system interface filter through a plurality of serially coupled filter logical resources.

19. A method as in claim 12, where said object definition database defines valid user objects, further comprising identifying and removing only partial user objects from said object definition database.

20. The storage subsystem of claim 1, wherein the logical resources are internal filter resources.

21. The storage subsystem of claim 20, wherein the user objects are defined as resource structures by an object definition database.

22. The software program embodied in a storage subsystem of claim 3, wherein an application programming interface generates the user objects, wherein the application programming interface is capable of generating each of an input/output target user object, a partitionable disk object, and a hot-spare pool object, the input/output target user object comprising a logical unit (LUN) resource, a flash copy filter, a fast write filter, and a driver automatic filter, the partitionable disk object comprising a physical disk, a free disk filter, and a partitioning filter, and the hot-spare pool object comprising a physical disk, a free disk filter, and a hot-swap spare pool.

23. A storage subsystem for use with a computer system according to claim 1, further comprising at least one user object that interfaces with two user objects that each comprise a logical unit resource.

24. A software program embodied in a storage subsystem of a computer system according to claim 3, wherein at least one user object interfaces with two user objects that each comprise a logical unit resource.

25. A storage subsystem as in claim 4, wherein at least one user object interfaces with two user objects that each comprise a logical unit resource.

* * * * *